(No Model.)
E. CARTWRIGHT.
VINEYARD OR FARM HOE.
No. 394,641. Patented Dec. 18, 1888.
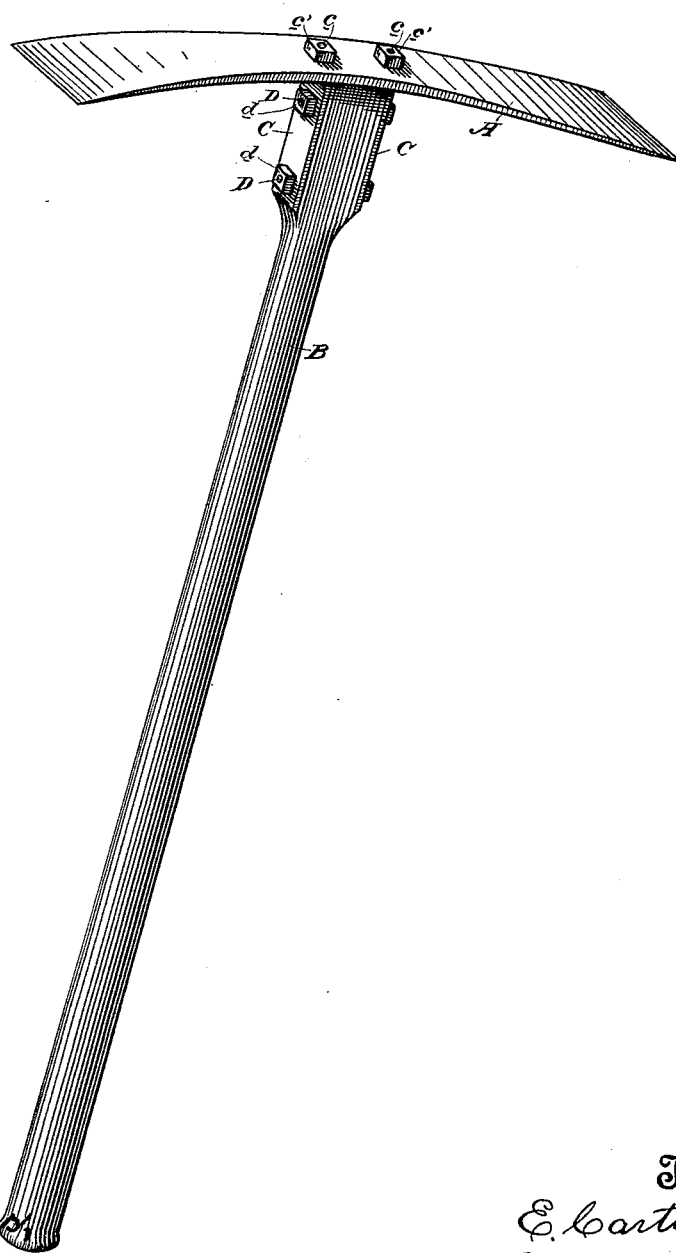
Witnesses:
Geo. H. Strong
J. H. Rouse
Inventor,
E. Cartwright
By Dewey & Co.
atty

UNITED STATES PATENT OFFICE.

EDGAR CARTWRIGHT, OF LINCOLN, CALIFORNIA.

VINEYARD OR FARM HOE.

SPECIFICATION forming part of Letters Patent No. 394,641, dated December 18, 1888.

Application filed April 14, 1888. Serial No. 270,646. (No model.)

*To all whom it may concern:*

Be it known that I, EDGAR CARTWRIGHT, of Lincoln, Placer county, State of California, have invented an Improvement in Vineyard or Farm Hoes; and I hereby declare the following to be a full, clear, and exact description of the same.

My invention relates to that class of hoes specially adapted for use in vineyards and on farms; and my invention consists in the novel double-ended blade and in the novel means for securing it to the handle, as I shall hereinafter more fully describe.

The object of my invention is to provide a simple, effective, and durable vineyard and farm hoe, the blade of which may be readily attached to or detached from the handle for sharpening or the substitution of another blade.

Referring to the accompanying drawing for a more complete explanation of my invention, the figure is a perspective view of my hoe.

A is the blade of the hoe. It is made of the best spring steel, and is a single piece having an elongated or oblong shape, with its ends made flaring and ground down to form a working or cutting edge at each end. It is secured to the handle B by means of side straps, C, the ends $c$ of which are turned down and threaded. These ends pass through the blade and receive nuts $c'$, which firmly hold the blade to the end of the handle. The straps are secured to the handle by means of cross-bolts D, passing through and through and receiving nuts $d$, by which they are tightened up. It will be seen that by removing the nuts $c'$ the blade may be taken off and another substituted, and by taking off the nuts $d$ and removing the bolts D the side straps may be taken off and renewed. The projecting ends or points of the blade on each side of the handle are equal in length and weight, so that the tool is well balanced. The blade is secured and kept tight to the handle, thus giving the handle full strength, and with the aid of a wrench the blade may be removed for sharpening. As far as this blade is concerned I may, if found desirable, use rivets for securing it to the handle; but I prefer the method shown.

The tool on account of having the handle made so readily removable may be called an "adjustable hoe."

Having thus described my invention, what I claim as new, and desire to secure by Letters Patent, is—

In a hoe, the handle and the elongated blade made of a single piece with a flaring working or cutting edge on each end, said ends being of equal length and weight on each side of the handle, in combination with the means for securing the blade to the handle, consisting of the side straps bolted to the handle on opposite sides and having the projecting ends threaded and passing through the blade at points upon each side of its center, and the nuts on said ends for holding the blade, substantially as herein described.

In witness whereof I have hereunto set my hand.

EDGAR CARTWRIGHT.

Witnesses:
H. BELMORE,
L. G. FOWLER.